Patented Nov. 7, 1950

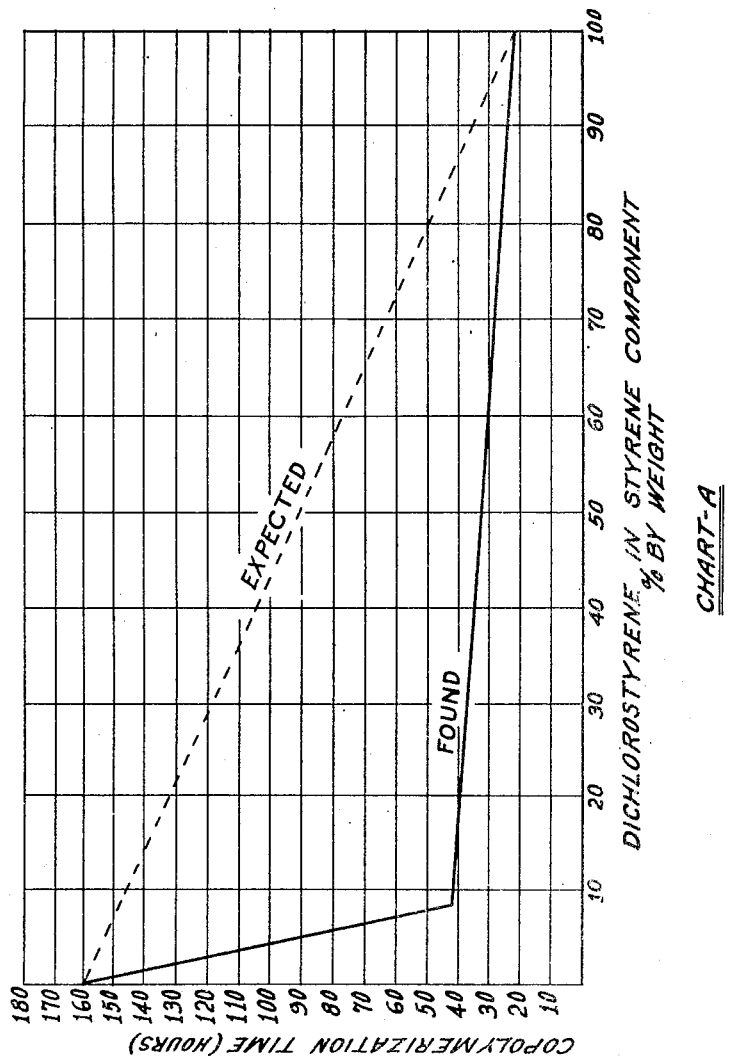

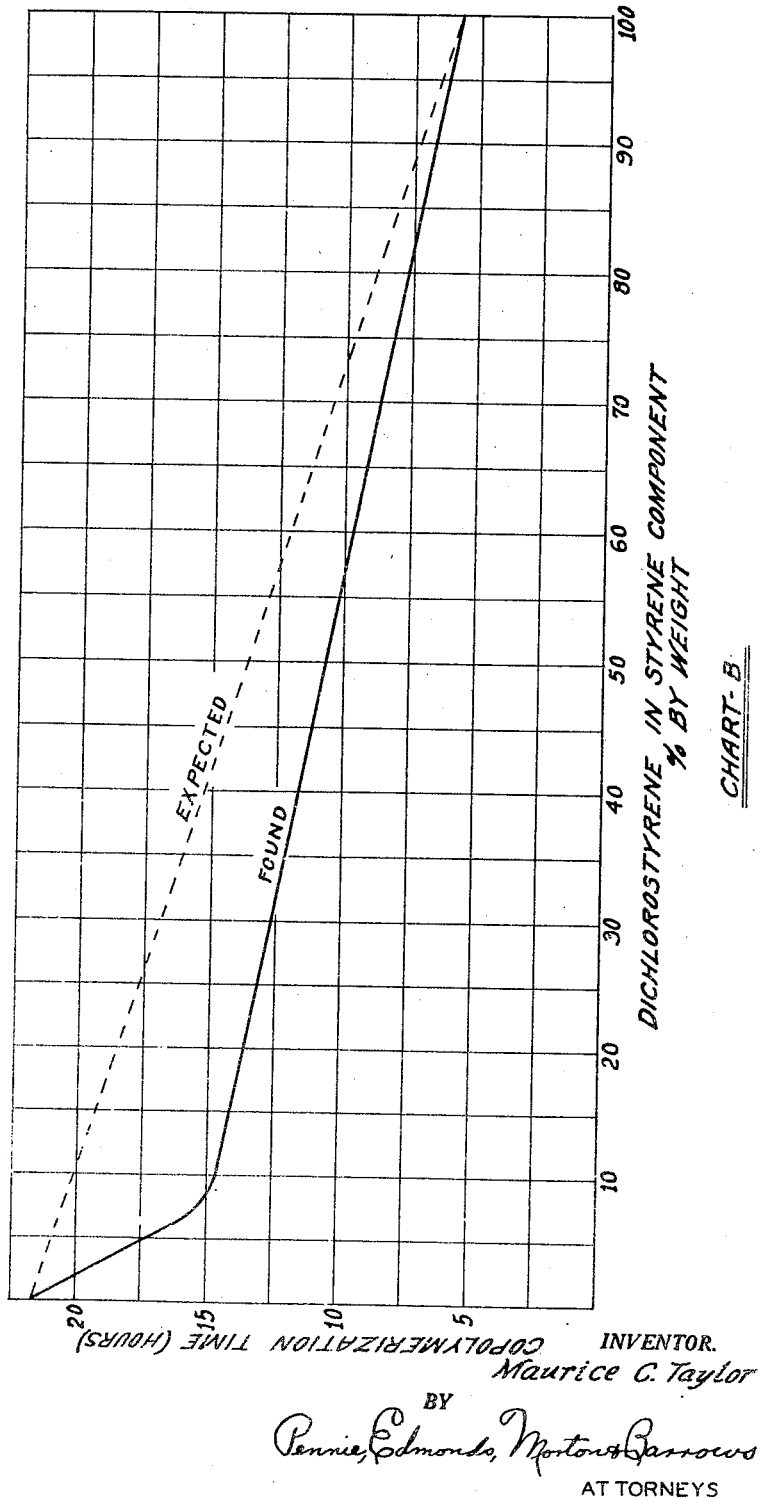

2,529,201

UNITED STATES PATENT OFFICE 2,529,201

DICHLOROSTYRENE AS ACCELERATOR IN THE POLYMERIZATION OF BUTADIENE-1,3 WITH STYRENE

Maurice C. Taylor, Niagara Falls, N. Y., assignor to Mathieson Chemical Corporation Application December 30, 1948, Serial No. 68,134

2 Claims. (Cl. 260—80.7)

This invention relates to improvements in the manufacture of copolymeric materials by the copolymerization of butadiene and styrene, and more particularly provides improvements in the process for preparing materials of this type whereby the copolymerization reaction may be so altered and accelerated as to increase the productive capacity of apparatus of a given size and to improve the quality of the product.

The present application is a continuation in part of my copending application Serial No. 510,928, filed November 19, 1943, now abandoned.

Synthetic rubber-like materials commonly designated synthetic rubber, have previously been prepared by the copolymerization of butadiene and styrene. Such interpolymerization is usually accomplished in aqueous emulsion containing, in addition to water and the copolymerization components, such materials as emulsifying agents, emulsion stabilizers, catalysts for accelerating the reaction and sometimes other modifiers.

However, production of such rubber-like materials prior to my present invention has encountered numerous difficulties. In the first place, the rate of reaction of the styrene and butadiene has been relatively slow and, accordingly, the process has been excessively time consuming. Further difficulties had been experienced with respect to the nature of the synthetic rubber products. For example, in the unvulcanized state, most synthetic rubbers have been found to be deficient in tackiness and ability to adhere upon being pressed together. Also, after vulcanization, they have been found to be deficient in resilience and resistance to softening and deterioration by heat and usually to be relatively flammable.

In recent years, a vast amount of research has been carried on having as its purpose the elimination or mitigation of such previously experienced difficulties. A substantial improvement in the art is disclosed and claimed in the copending application of John C. Michalek, Serial No. 449,475, filed July 2, 1942, now abandoned, in accordance with which certain polymerizable nuclear chlorinated styrenes are used, instead of the styrene previously copolymerized with conjugated open chain dienes in the synthesis of such materials. A disadvantage in the substituting of nuclear chlorinated styrene for styrene in such reactions is the added cost of the nuclear chlorinated styrenes over the cost of styrene.

I have now discovered that, even if only a minor proportion of nuclear dichlorostyrene be added to the monomeric mixture of styrene and butadiene-1,3, various surprising results are obtained. I have found, for instance, that the polymerization rate under any given polymerizing conditions is materially and unexpectedly accelerated and that the characteristics of the product are generally improved.

It has previously been found that, in the copolymerization of butadiene with styrene, the ratio of butadiene to styrene radicals in the copolymeric product is usually greater than the proportion of these materials in the charge. This appears to be due to the fact that the butadiene has a faster rate of reaction than has styrene under given conditions. Whatever the cause, the product has generally been found to be relatively richer in the butadiene radicals and poorer in styrene radicals.

Similarly, it has been found that, in the copolymerization of butadiene with nuclear dichlorostyrene, the ratio of the butadiene radicals to the dichlorostyrene radicals in the copolymeric product is generally less than the ratio of these materials in the charge. This appears to be due to the extraordinary ease with which the dichlorostyrene is polymerized.

An advantage of my present invention is that, by my improved process, I can, to a considerable extent, control the ratio of the various components in my product. I have found that, by adjusting the ratio of the dichlorostyrene to styrene, I can control the rate of copolymerization of my vinyl component relative to the rate of copolymerization of the butadiene and thus influence the ratio of butadiene radicals to vinyl radicals in the product. Further, in this way, I have found it possible greatly to accelerate the overall rate of copolymerization.

Since the rate at which the butadiene copolymerizes with nuclear dichlorostyrenes is much greater than its rate of copolymerization with styrene, it might be expected that the rate of copolymerization of the butadiene with a mixture of styrene and nuclear dichlorostyrene would be proportional to the relative amount of these constituents of the vinyl component. Thus, by substituting an equal molar proportion, for instance, of the dichlorostyrene for half of the styrene previously used, it might be expected that the rate of polymerization would be increased by only 50% of the difference in polymerization rate of styrene and dichlorostyrene, respectively, with the butadiene.

I have found, however, that when even a very small proportion of the dichlorostyrene is substituted for a like proportion of styrene, a surprisingly disproportionate change in copolymerization rate is obtained, the reaction proceeding at a much faster rate than could reasonably be expected from the relative proportions of the dichlorostyrene and the styrene.

I am unable, at present, to explain or account for this surprising disproportionate increase in reaction rate. However, the results which I have obtained are graphically illustrated by the charts constituting the accompanying drawings whereon the time required for the copolymerization reaction in hours is plotted against the proportion of nuclear dichlorostyrene, expressed in percentage by weight of the vinyl component.

In the operations illustrated on Chart A, the operating conditions were comparable in every respect, excepting the composition of my vinyl component. The operations illustrated on Chart B were likewise comparable in every respect, excepting the compositions of the vinyl component. However, the operating conditions of the operations of Chart B were such as generally to expedite polymerization rate by the use of expedients well known today, but little known at the date of my invention, while the operations on Chart A generally were carried out under conditions not utilizing the more recently developed reaction accelerating expedients.

As appears from Chart A, where the vinyl component consisted solely of styrene, the time required for copolymerization was 160 hours. Where my vinyl component consisted solely of nuclear dichlorostyrene, the reaction time was about 22 hours. It would be expected that, where the vinyl component consisted of mixtures of styrene and dichlorostyrene, the reaction time would fall upon the straight, broken line connecting these points, and decrease uniformly in proportion to the percentage of the dichlorostyrene used. It is shown, however, by these tests that by using only relatively small proportions of the dichlorostyrene, the reaction time very sharply decreases following generally the solid line of the chart. This sharp reduction in reaction rate continues until about 8 to 10% of dichlorostyrene has been substituted for the styrene and then the curve tends to flatten out. Thus using as little as about 8% by weight of the dichlorostyrene and about 92% of styrene, the reaction time is reduced to about 40 hours, a reduction of about 75% in the time required where styrene alone is used as the vinyl component of the butadiene-vinyl compound polymerization mixture. By substituting still larger quantities of dichlorostyrene for styrene, the reaction time is further reduced but at a markedly reduced rate. By increasing the proportion of dichlorostyrene used beyond 8 to 10% by weight of the vinyl component, only a relatively small decrease in reaction time is attained.

As previously noted, the presence of very small proportions of dichlorostyrene in the mixture is sufficient to show this extraordinary effect. The use of about 3% or more by weight has generally been found materially to reduce the reaction time and to give highly satisfactory results. I prefer to use no less than about 3%, but it will be understood that the 3% figure is not particularly critical. So long as enough dichlorostyrene is used to give a noticeable acceleration of the reaction rate, it is within the contemplation of the present invention even though somewhat less than 3%. Proportions of dichlorostyrene in excess of about 8–10% do not give proportionate benefits and generally would not be warranted in view of the higher cost of the dichlorostyrene.

It is recognized, as previously indicated, that by modern methods, the reaction rate generally may be increased, for instance, by the use of improved catalysts, and accelerators, greater purification of the reactants to remove anticatalysts and the like, but this has not resulted in material changes in the shape of the curve shown on Chart A, nor changes in the relative reaction rates.

The curve shown on Chart B is quite similar in shape to that of Chart A. The reaction time has, in all cases, been greatly reduced in the runs of Chart B over that of the runs of Chart A by the use of more modern reaction-accelerating conditions, in conjunction with the varying of proportion of dichlorostyrene in the vinyl component. The solid line on Chart B was plotted from data from a series of runs, identical except for a variation in the relative proportions of dichlorostyrene and styrene used. In each run the composition of the reacting mixture was as follows:

| Component: | Parts by weight |
|---|---|
| Water | 180.0 |
| Soap | 2.0 |
| Dispersing agent | 0.5 |
| Potassium persulfate | 0.075 |
| Sodium silicate solution (30%) | 0.34 |
| Dodecyl mercaptan | 0.4 |
| Potassium ferro cyanide | 0.1 |
| Butadiene-1,3 | 70.0 |
| Styrene-dichlorostyrene component | 30.0 |

In each of the runs, the soap, dispersing agent, persulfate, silicate solution and ferro cyanide were dissolved in the water. The dodecyl mercaptan was dissolved in the styrene-dichlorostyrene component which was then emulsified with the aqueous solution. The resultant emulsion was charged to an autoclave and the butadiene added under pressure. Agitation was maintained in the autoclave and the temperature therein was held at 40° C. for a period of time sufficient to cause polymerization to proceed to 50% completion.

In the first of these runs, styrene alone was used as the vinyl component and under these conditions the copolymerization was 50% complete in 23.5 hours. Where 10% dichlorostyrene was substituted for an equal weight of the styrene, 50% copolymerization was effected in 14.5 hours. Where the proportion of dichlorostyrene was increased to 50% of the total vinyl component, time for effecting 50% copolymerization was decreased to 11.3 hours and where the vinyl component was 100% dichlorostyrene, time for effecting 50% copolymerization was 6.5 hours.

In the foregoing tests, the dispersing agent used was the sodium salt of a condensed sulfonic acid marketed under the trade name "Tamol MNO."

An important advantage of my present invention is this extraordinary increase in reaction rate occasioned by the use of a surprisingly small proportion of the dichlorostyrene, thus making it possible to increase the productive capacity of existing or proposed equipment by approximately 4 or 5 folds, or conversely enabling one to produce a given amount of copolymer in equipment one-fourth to one-fifth the size previously required and at very little additional cost.

A further advantage is that, by reason of this acceleration of the reaction made possible by my present invention, it becomes commercially practical to use in such a copolymerization a wide variety of modifying agents, the use of which had been impractical prior to my present invention because of their retarding effect on the copolymerization rate. Such modifiers for example as butyl mercaptan, lauryl mercaptan, and the like, have been found to have important modifying effects on the characteristics of the rubber product, but also tend to decrease the rate of reaction so that their use would normally be attended by a loss in capacity proportional to their retarding effect. By the process of my present invention, however, it is possible to compensate more than adequately for such retardation occasioned by the use of these modifiers. Thus, my invention makes practical the incorporation with the copolymerization mixture of a considerably increased variety of modifying agents heretofore barred therefrom because of their retarding effect on the reaction rate.

In accordance with a further aspect of my present invention, the rate of reaction of my vinyl component may, by properly proportioning the constituents thereof, be so adjusted relative to the rate of reaction of the butadiene as to produce a copolymer in which the ratio of the vinyl radicals to the butadiene radicals is the same as the ratio of these components in the charge. Other desired ratios of the vinyl and butadiene radicals in the product may similarly be effected.

It will be understood that the butadiene referred to herein and in the appended claims is the conjugated butadiene-1,3.

The nuclear dichlorostyrene used, in accordance with my present invention, may with advantage be the nuclear dichlorostyrene characterized by a density $(D_4^{25})$ of 1.236 to 1.280 and a refractive index $(N_n^{25})$ of from 1.5724 to 1.5838 described more fully in the copending application of John C. Michalek, Serial No. 387,862, filed April 10, 1941, now abandoned. It may include any of the pure isomers or mixtures thereof, for example, 2,3-, 2,4-, 2,5-, 2,6-, 3,4- or 3,5-dichlorostyrene.

The proportions of the butadiene and the vinyl component used in accordance with my present invention, may be varied over a considerable range with respect to each other. Advantageously the vinyl component, i. e., styrene plus dichlorostyrene, may represent about 20 to 50% by weight of the polymerizable components, i. e., vinyl component plus butadiene. However, some advantages of the invention are attained even without this range so long as the reaction is a copolymerization of the butadiene-styrene type.

The polymerization reaction, in accordance with my invention, is with advantage effected in aqueous emulsion as previously noted. The runs represented on Chart A were made by the following general procedure.

The vinyl component and butadiene in the desired proportions are charged to an autoclave equipped with a stirrer. There is also added water and a suitable catalyst, for example, hydrogen peroxide, urea peroxide, benzoyl peroxide, potassium persulfate, or sodium persulfate. An emulsifying agent, an emulsion stabilizer, such as gelatin, glue, or casein and, if desired, a modifying agent, such as ethylene dichloride, chloroform, carbon tetrachloride, or other closely related halogen compounds, and a surface tension regulator, such as capryl alcohol, or normal octyl alcohol, are also charged to the autoclave. The autoclave is then closed and heated to the reaction temperature for a period of time sufficient to complete the reaction, or to carry the copolymerization to the desired degree of completion. In normal operation, the reaction is seldom carried to completion, but is carried to some point substantially short of completion. The polymeric material is then separated from the remaining monomeric mixture and the latter used in a subsequent operation. After the reaction has been carried to the desired degree of completion, the autoclave is cooled, the copolymer coagulated by conventional methods, such as by freezing, acidifying, or salting out, and is separated from the mixture.

If desired, the emulsion may be prepared and subsequently charged to the autoclave or a solution of the accessory materials may be prepared in the autoclave and the copolymerizing components subsequently added and emulsified therewith.

Emulsifying agents which may be used with advantage in my process include ordinary soap, that is, alkali metal salts of high molecular weight fatty acids, alkyl sulfates, alkali metal alkyl benzene, or alkyl naphthalene sulfonates, alkyl metal sulfo ethyl-oleate and salts of other sulfonated esters and oils, as well as the more common soaps, such as sodium, or ammonium oleate or laurate. In fact, ammonium oleate, or laurate have been found to be particularly effective emulsifying agents for this purpose. The proportion of emulsifying agents used is not particularly critical and is even less critical than where styrene alone is used as the vinyl component. Proportions by weight ranging from about 0.5 to about 15% of the principal reactive components of the copolymerizing mixture have been used with advantage.

The proportion of catalyst employed in the process of my present invention is also less critical than in operations where styrene alone is used as the monomeric vinyl component and may be varied within wide limits. Even in the absence of an accelerating catalyst, the reaction has been found to proceed more rapidly than the reaction of the butadiene with styrene when a catalyst is used. However, the reaction of my present invention proceeds even more rapidly where a catalyst such as previously mentioned is used and therefore the use of such catalyst is usually desirable.

Water insoluble alcohols having from say 4 to 10 carbon atoms per molecule may be used as surface tension regulators. The proportions of these and other modifying agents used are likewise not critical and may be varied over a considerable range as understood by the art, depending upon the results desired. Suitable alcohols for this purpose include normal octyl alcohol, capryl alcohol, and the like.

Various other modifying agents including anti-cross-linkers, such as carbon tetrachloride, as well as other known types of modifying agents including lauryl mercaptan, ethylene and other olefins may be incorporated in the emulsion.

It is desirable that the various components and reagents used in accordance with my present invention be free from aldehydes since even small amounts of aldehydes appear to hinder the copolymerization reaction. Generally, any aldehydes present in the various components may be readily removed therefrom prior to use by treatment with a carbonyl reactive reagent, such, for example, as sodium bisulfite, methabisulfite, sodium hydrosulfite, or the like. Since only small amounts of aldehydes are ordinarily present in these constituents, treatment with solid bisulfite, or the like, serves to remove such impurities. It is desirable to take the precaution of removing any aldehyde present in order that the copolymerization may proceed at the rapid rate characteristic of the copolymerization components of my present invention.

A further important advantage of my improved process is that the reaction may, if desired, be carried substantially to completion. It is generally recognized that, in such operations, the rate of reaction substantially decreases as the reaction approaches completion and, for this reason, the reaction is frequently stopped short of completion. However, because of the increased rate of reaction resulting in desirable products, the total required time is not unduly extended by carrying the reaction substantially to completion.

In carrying out the operation, it is convenient to follow the course of the reaction by removing samples from time to time and acidifying, salting out, or otherwise coagulating the reaction product. A clear, aqueous layer remaining after the coagulation, i. e., free from unreacted hydrocarbons or dichlorostyrene indicates that the reaction is complete.

My invention will be further illustrated by the following specific examples of its application in the production of my improved copolymeric product. It will be understood, however, that these examples are for purposes of illustration and that the invention is not limited thereto. In each instance the proportions are by weight.

*Example I*

An aqueous solution was prepared by adding 4 parts ammonium oleate, 1 part glue and 4.2 parts of sodium perborate to 250 parts of water. My vinyl component, comprising 28.2 parts of styrene and 2.48 parts of nuclear dichlorostyrene and 0.05 part of benzoyl peroxide, were then slowly added to the aqueous solution with stirring. The resulting emulsion was then charged to a rocking autoclave and 69.32 parts of conjugated butadiene was charged under pressure to the autoclave. The mixture was held in the autoclave for 41½ hours at a temperature of 75° C. with constantly maintained agitation. At the end of this period, the autoclave was opened, the emulsion diluted with about ten times its volume of water and acidified with diluted acetic acid until the emulsion was broken. After coagulation, the copolymer was washed on a rubber mill and dried. The dried product was found by analysis to have an iodine value of 232 and a toluene solubility of 51.3%. The molecular weight of the toluene soluble portion was found to be 67,400.

*Example II*

An aqueous solution was prepared by adding 4 parts ammonium stearate, 1 part glue and 4.2 parts of sodium perborate to 250 parts of water. There were emulsified with this aqueous solution 2.6 parts of nuclear dichlorostyrene and 28.2 parts of styrene. Thereafter, the emulsion was charged to the autoclave together with 69.2 parts of the conjugated butadiene. After being held in the autoclave with agitation for 59 hours at a temperature of 55° C., the reaction was found to be complete. After washing and drying, the rubbery copolymer was found to have an iodine value of 200 and a toluene solubility of 41%, the toluene soluble portion having a molecular weight of 73,000.

In a comparable run from which the nuclear dichlorostyrene was omitted and a correspondingly increased amount of styrene used, 180 hours was required for completion of the reaction.

The reaction temperature and the period of time required for completion of the copolymerization reaction are to a considerable extent interdependent. The operating temperature may be varied over a considerable range, the optimum temperature being largely dependent upon the components of the particular copolymerizing mixture.

An important advantage derived from the use of the present invention, particularly where the proportions of dichlorostyrene in the vinyl component approaches 8 to 10%, is that the product is more tacky in its unvulcanized state and when pressed together adheres to a remarkable degree, in this respect more normally resembling natural rubber. They are, likewise, more resistant to softening and deterioration by heat. The nonflammability of these products of my improved process as compared with synthetic products of the type previously available, is the further important advantage. By reason of this characteristic, they are less likely to ignite when exposed to fire and other sources of heat and are not harmed under circumstances which would seriously damage natural or halogen-free synthetic rubber compositions. The vulcanization of my improved product, even further reduces its flammability.

I have found products produced in accordance with the process of the present invention to be more susceptible to vulcanization and plasticization than are the previously available halogen-free synthetic rubbers. Relatively small amounts of a plasticizer compounded therewith yield highly plasticized products which are especially suitable for purposes such as the forming of thin film-like products and for coating wires as an insulation. Articles prepared from the products of my improved process are extremely flexible and have improved resistance to heat. Further, these improved products, though thermoplastic are deformed only at temperatures above those which render useless ordinary halogen-free synthetic rubbers. My products are particularly useful as wire coating compositions and have advantageously low power factors.

It will be understood that the intended meaning of the terms "polymerize," "polymerizable," and "polymerization" as used herein, is not restricted to the common dictionary definition, a union between two or more like molecules to form another compound having the same elements in the same proportions but a higher molecular weight and different physical properties, but that such terms are used herein in the more general sense, as commonly used in the art, to include inter-polymerization between unlike molecules, as indicated by the context.

I claim:

1. In the copolymerization of a mixture of monomeric materials consisting predominantly of butadiene-1,3 and styrene in which the concentration of the monomeric materials in water approximates 100 parts to about 180 to 250 parts of water by weight and which contains about 0.5 to 15% by weight of the monomeric materials of an emulsifying agent selected from the class consisting of alkali metal salts of high molecular weight fatty acids, ammonium salts of high molecular weight fatty acids, alkyl sulfates, alkali metal alkyl benzene sulfonates, and alkyl naphthalene sulfonates and in which a catalyst selected from the class consisting of hydrogen peroxide, urea peroxide, benzoyl peroxide, potassium persulfate, sodium persulfate and sodium perborate is employed, the improvement which comprises including in the emulsion, while it is being subjected to conditions producing copolymerization, a minor proportion of nuclear dichlorostyrene, said dichlorostyrene being present in an amount effective to accelerate the reaction rate, but not substantially in excess of 8 to 10% of the combined weight of the styrene and dichlorostyrene, and maintaining said combined weight within the range of 20 to 50% of the total weight of the monomeric materials.

2. In the copolymerization of a mixture of monomeric materials consisting predominantly of butadiene-1,3 and styrene in which the concentration of the monomeric materials in water approximates 100 parts to about 180 parts of water by weight and which contains about 2 parts by weight of soap, about 0.5 part of a sodium salt of a condensed sulfonic acid, about 0.075 part potassium persulfate, about 0.34 part of 30% sodium silicate solution, about 0.4 part dodecyl mercaptan, about 0.1 part potassium ferro cyanide, the improvement which comprises including in the emulsion, while it is being subjected to conditions producing copolymerization, a minor proportion of nuclear dichlorostyrene, said dichlorostyrene being present in an amount effective to accelerate the reaction rate, but not substantially in excess of 8 to 10% of the combined weight of the styrene and dichlorostyrene, and maintaining said combined weight within the approximate ratio in parts by weight of 30 to 70 parts butadiene-1,3.

MAURICE C. TAYLOR.

REFERENCES CITED

The following references are of record in the file of this patent:

UNITED STATES PATENTS

| Number | Name | Date |
|---|---|---|
| 2,384,535 | Craig | Sept. 11, 1945 |